United States Patent Office 3,507,636
Patented Apr. 21, 1970

3,507,636
ETHYLENE-PROPYLENE-TERPOLYMER POUR DEPRESSANT AND FUEL CONTAINING SAME
William M. Sweeney, Wappingers Falls, N.Y., assignor to Texaco Inc., New York, N.Y., a corporation of Delaware
No Drawing. Filed Dec. 8, 1966, Ser. No. 600,013
Int. Cl. C10l 1/14
U.S. Cl. 44—62
8 Claims

ABSTRACT OF THE DISCLOSURE

A pour depressant composition is disclosed as well as a fuel composition containing the pour depressant. The pour depressant is an amorphous, substantially saturated ethylene-proplyene-terpolymer consisting of ethylene, propylene and a higher olefin having from 5 to 30 carbon atoms in mole ratios respectively of 50 to about 90 percent ethylene, 10 to about 50 percent propylene and 0.1 to 10 percent of said higher olefin, said ethylene-propylene-terpolymer having an inherent viscosity in the range of 0.2 to 1.5.

---

This invention relates to a pour depressant composition and to a mineral oil composition containing same. The pour depressant is effective for substantially reducing the pour point of relatively viscous fuel oils, diesel oils, middle distillates and other viscous hydrocarbon oils. The pour depressant composition of the invention is also useful as an additive for gasoline wherein the composition acts as a modifier of induction system deposits.

The novel pour depressant composition of the invention comprises an amorphous, substantially saturated, ethylene-propylene-terpolymer consisting of 50 to about 90 mole percent ethylene, 10 to about 50 mole percent propylene and 0.1 to 10 mole percent of a higher olefin having from 5 to 30 carbon atoms, the inherent viscosity of the terpolymer being in the range of 0.2 to 1.5.

Heating oils, diesel fuels and liquid hydrocarbon oils employed in cold climates or exposed to low temperatures frequently require the use of an additive to maintain their fluidity or to meet critical pour point specifications for the oil in question. Additives that are effective for this are called pour depressants. While the art discloses numerous pour depressants, many are not suitable because of the high cost or high concentration required or because they do not lower the pour point to the required temperature. An effective pour depressant is one which will substantially reduce the pour point of a treated oil when used in a small concentration without imparting any undesirable effects.

It has now been discovered that certain terpolymers prepared under conditions leading to a substantially saturated, amorphous terpolymer product having a prescribed inherent viscosity are surprisingly effective in low concentrations as pour depressants for mineral oil compositions. This invention is directed to the novel pour depressant and to mineral oil compositions containing the pour depressant.

The pour depressant of this invention is an amorphous, substantially saturated ethylene-propylene-terpolymer, consisting of polymerized ethylene, propylene and a higher olefin having from 5 to 30 carbon atoms in the proportions of 50 to about 90 mole percent ethylene, 10 to about 50 mole percent propylene and 0.1 to 10 mole percent of the higher olefin having an inherent viscosity of from 0.2 to 1.5. Preferably, the pour depressant consists of from 60 to about 80 mole percent ethylene, 20 to about 40 mole percent propylene and 1 to 5 mole percent higher olefin and has an inherent viscosity in the range of 0.3 to 0.7.

The inherent viscosity equals the natural log of the specific viscosity divided by the concentration in grams per one hundred ml. The specific viscosity for this equation is the expression of a ratio of the viscosity of the solution divided by the viscosity of the solvent (see Appendix D, p. 103, Report No. 4 in "Polymer Chemistry," by Robert Magovern, Stanford Research Institute, April 1965).

The terpolymers are prepared by copolymerizing ethylene, propylene and a higher olefin in the stated proportions. The higher olefin reacted is an olefin or polyolefin having more than three carbon atoms. Preferably, it is a non-conjugated diene having from 5 to 30 carbon atoms and preferably from 6 to 20 carbon atoms. Specific dienes which can be employed include bicyclo[2,2,1]hepta-2,5-diene, 1,4-cyclohexadiene, 1,5-cyclooctadiene, dicyclopentadiene, di-isopropenyl benzene dipentene, 2,2-dimethyl-1,5-hexadiene, 1,5-heptadiene, 1,5-hexadiene, 2-methyl-1,4-cyclohexadiene, methyl cyclopentadiene dimer, 5-methylene-2-norbornene, 3-methyl-1,5-heptadiene, 2-methyl-1,5-hexadiene, 3-methyl-1,5-hexadiene, 1,7-octadiene, 1,4-pentadiene, 4-vinyl-1-cyclohexene, and 2-methyl-1,4-pentadiene. Straight chain olefins may also be used including the straight chain alpha olefins, such as hexene-1 and decene-1.

The ethylene-propylene-terpolymers can be prepared by a conventional polymerization method. In general, a mixture of the ethylene, propylene and higher olefin in a suitable solvent is polymerized under atmospheric or superatmospheric pressure in the presence of hydrogen and a polymerization catalyst, such as a Zeigler-Natta catalyst, to produce the amorphous, substantially saturated terpolymer product. Terpolymers having a broad range of inherent viscosities can be so prepared by varying the concentration of the olefin components, the concentration and specific nature of the catalyst employed as well as the polymerization reaction temperature and the time of reaction. The presence of hydrogen is critical to moderate the polymerization reaction and produce a terpolymer that is substantially saturated and within the prescribed inherent viscosity range. When hydrogen is not used in the polymerization reaction, extremely high molecular weight terpolymers are produced which exhibit no effect or a minimal effect as pour depressants. The products of this invention differ markedly from pour depressants obtained by cracking which exhibit a substantially higher degree of unsaturation.

The proportions of the olefins feed gases present in the gas feed mixture are different from their proportions in the polymerization reaction product because of the different reaction rates of the various olefins. Hydrogen is employed in the feed gas mixture in an amount ranging from 1 to 20 mole percent and preferably from 5 to 10 mole percent.

The pour depressant of the invention is employed in middle distillate mineral oils in a concentration ranging from about 0.001 to 1 weight percent. The preferred concentration of the pour depressant in an amount in the range of 0.005 to 0.05 weight percent which corresponds to about 15 to 150 ptb. (pounds per thousand barrels).

The following examples illustrate the preparation of the pour depressants of the invention and their effectiveness for lowering the pour point of viscous mineral oils.

EXAMPLE I

A gas mixture was prepared consisting of 33.2% ethylene, 58.8% propylene and 7.4% hydrogen. 2 liters of n-heptane at 70° F. was saturated with a portion of the gas mixture followed by the addition of 2 milliliters of dicyclopentadiene to make an n-heptane solution of the olefin monomers. Polymerization was initiated and continued over twenty minutes by gradually adding 10 milliliters of a 20% solution of diethylaluminum chloride in n-heptane and 2.5 milliliters of a 20% solution of tributyl vanadate in n-heptane while continuously passing the ethylene-propylene-hydrogen gas mixture through the reaction mixture.

On completion of the reaction, the polymerization mixture in n-heptane (cement) was washed with a dilute aqueous solution of hydrochloric acid. 20 grams of a paraffinic mineral oil having a viscosity of 97 S.S.U. at 100° F. was added to the reaction mixture and the n-heptane removed by distillation to a temperature of about 520° F. Analysis of the mineral oil mixture indicated that it consisted of about 50% of the terpolymer. The terpolymer consisted of 68 mole percent ethylene, the balance propylene and dicyclopentadiene, had an inherent viscosity (1% solution in toluene at 100° F.) of about 0.476 and was amorphous and substantially saturated except for the residual unsaturation contributed by dicyclopentadiene incorporated in the polymer chain as indicated by NMR (nuclear magnetic resonance) and infrared analysis.

The pour depressant effect of the terpolymer of the invention is shown by the pour point test using a middle distillate mineral oil having the following inspection values:

Specifications of middle distillate fuel

| | |
|---|---|
| Gravity | 32.9 |
| ASTM pour (° F.) | −10 |
| Flash point (° F.) | 166 |
| FIA analysis (percent): | |
|     Aromatics | 34.0 |
|     Olefins | 4.5 |
|     Saturates | 61.5 |
| ASTM distillation ° F.: | |
|     IBP | 367 |
|     10 | 426 |
|     50 | 510 |
|     90 | 585 |
|     EP | 637 |

When the pour depressant of this example was used at a concentration of 100 ptb. (pounds per thousand barrels), i.e., 50% active terpolymer in oil carrier, the ethylene-propylene-terpolymer reduced the pour point of the middle distillate to −70° F. from the −10° F. pour point for the middle distillate oil.

EXAMPLE II

A gas mixture consisting of 63% propylene, 31.9% ethylene and 5.4% hydrogen was prepared. 2 liters of n-heptane at 37° F. was saturated with a portion of the gas mixture followed by the addition of 4.0 milliliters of decene-1 to make an n-heptane solution of the olefin monomers. Polymerization was initiated and continued over a twenty-three minute period at temperatures from 40–60° F. by gradually adding 6 milliliters of a 20% solution of diethyl aluminum chloride in n-heptane and 1 milliliter of a 20% solution of tri-n-butyl vanadate in n-heptane while passing the gas mixture through the reaction mixture.

On completion of the reaction, the reaction mixture was washed with a dilute aqueous solution of hydrochloric acid and the terpolymer precipitated from the reaction mixture with methanol. The recovered terpolymer consisted of 65 mole percent ethylene the balance being propylene and decene-1, had an iodine No. of 0.5, an inherent viscosity of 1.33 (at 1% concentration in toluene at 100° F.) and was amorphous and substantially saturated as indicated by NMR and infrared spectra.

The terpolymer of this example was added to the middle distillate described in Example I above at a concentration of 100 ptb. This terpolymer reduced the pour point of the middle distillate fuel oil to −60° F. from the value of −10° F. for the untreated oil.

EXAMPLE III

A gas mixture consisting of 58.6 mole percent propylene, 34 mole percent ethylene and 7.1 percent hydrogen was prepared. About 2 liters of n-heptane at 80° F. was saturated with a portion of the gas mixture followed by the addition of about 1 milliliter of dicyclopentadiene to make an n-heptane solution of the olefin monomers. Polymerization was initiated and continued over a seventeen minute period at about 80° F. by gradually adding 8 milliliters of a 20% solution of diethyl aluminum chloride and 2 ml. of a 20% solution of tri-n-butyl vanadate while passing the gas mixture through the reaction mixture.

On completion of the reaction, the reaction mixture was washed with a dilute aqueous solution of hydrochloric acid to remove the catalyst. The reaction mixture was then heated to about 120° F. to degas the cement (terpolymer in n-heptane). The cement was stripped to about one-half of its volume and about 25 grams of mineral oil having an S.S.U. of 97 at 100° F. added together with 0.1% of a conventional anti-oxidant. This mixture was stripped to a pot temperature of about 500° F. to effect the recovery of about 43 grams of product.

The reaction product contained 43% of terpolymer by dialysis, consisting of 68 mole percent ethylene, the balance being propylene and dicyclopentadiene, was substantially saturated and amorphous as determined by iodine number and infrared analysis and the oil mixture had an inherent viscosity of 0.223 as determined as a 1% solution in toluene at 100° F. which calculates to an inherent viscosity of 0.520 for the terpolymer.

The terpolymer oil mixture at 100 ptb. reduced the pour point of a middle distillate fuel oil to −50° F. from −10° F. for the untreated oil.

EXAMPLE IV

A gas mixture consisting of 59.4 mole percent propylene, 32.6 mole percent ethylene and 7.5 mole percent hydrogen was prepared. About 2 liters of n-heptane was saturated with a proportion of the gas mixture, followed by the addition of about 4 milliliters of dicyclopentadiene to make an n-heptane solution of the olefin monomers. Polymerization was initiated and continued at temperatures from 55 to 60° F. for 20 minutes using the catalyst and procedure described in Example III above.

The reaction product was treated as in Example III above and recovered as a mixture in mineral oil containing 41 percent of the terpolymer. The terpolymer consisted of 67 mole percent ethylene, the balance being propylene and dicyclopentadiene, was substantially saturated and amorphous as determined by iodine number and infrared analysis. The oil mixture had an inherent viscosity of 0.271, which calculates to an inherent viscosity of 0.660 for the terpolymer per se. The terpolymer oil mixture at a concentration of 100 ptb. reduced the pour point of a middle distillate fuel oil to −45° F. from −10° F. for the untreated middle distillate fuel oil.

Obviously, many modifications and variations of the invention, as hereinbefore set forth, may be made without departing from the spirit and scope thereof, and therefore only such limitations should be imposed as are indicated in the appended claims.

I claim:

1. A pour depressant composition prepared by reacting ethylene, propylene and a higher olefin having from 5 to 30 carbon atoms, in mole ratios of from 50 to about 90 percent ethylene, 10 to about 50 percent propylene and from 0.1 to 10 percent of said higher olefin, under polymerization conditions and in the presence of hydrogen to produce an amorphous, ethylene-propylene-terpolymer having an inherent viscosity in the range of 0.2 to 1.5.

2. A pour depressant composition according to claim 1 consisting of 60 to about 80 mole percent ethylene, 20 to about 40 mole percent propylene and 1 to 5 mole percent of said higher olefin, said ethylene-propylene-terpolymer having an inherent viscosity in the range of 0.3 to 0.7.

3. A pour depressant composition according to claim 1 in which said higher olefin is decene-1.

4. A pour depressant composition according to claim 1 in which said higher olefin is dicyclopentadiene.

5. A middle distillate oil composition comprising a major proportion of a mineral oil having a high pour point and from about 0.001 to 1 weight percent of a pour depressant composition prepared by reacting ethylene, propylene and a higher olefin having from 5 to 30 carbon atoms, in mole ratios of 50 to about 90 percent ethylene, 10 to about 50 percent propylene and 0.1 to 10 percent of said higher olefin, under polymerization conditions and in the presence of hydrogen to produce an amorphous, ethylene-propylene-terpolymer having an inherent viscosity in the range of 0.2 to 1.5.

6. A middle distillate oil composition according to claim 5 in which said amorphous, ethylene-propylene-terpolymer consists of 60 to about 80 mole percent ethylene, 20 to about 40 mole percent propylene and 1 to 5 mole percent of said higher olefin, said terpolymer having an inherent viscosity in the range of 0.3 to 0.7.

7. A middle distillate oil composition according to claim 5 in which said higher olefin is decene-1.

8. A middle distillate oil composition according to claim 5, in which said higher olefin is dicyclopentadiene.

References Cited

UNITED STATES PATENTS

| | | | |
|---|---|---|---|
| 3,374,073 | 3/1968 | Gergel | 44—62 |
| 3,388,977 | 6/1968 | Burkard et al. | 44—62 |

DANIEL E. WYMAN, Primary Examiner

Y. H. SMITH, Assistant Examiner

U.S. Cl. X.R.

44—80